US009032422B2

(12) United States Patent
Lee et al.

(10) Patent No.: US 9,032,422 B2
(45) Date of Patent: May 12, 2015

(54) APPARATUS AND METHOD FOR SUPPORTING SUSPEND OF COMPOSITE NETWORK DEVICE

(75) Inventors: Kam-Rok Lee, Seoul (KR); Denis Vinogradov, Suwon-si (KR); Jeong-Hoon Park, Suwon-si (KR); Jae-Young Jung, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 876 days.

(21) Appl. No.: 12/800,940

(22) Filed: May 26, 2010

(65) Prior Publication Data

US 2010/0306788 A1  Dec. 2, 2010

(30) Foreign Application Priority Data

May 26, 2009  (KR) .............................. 10-2009-45748

(51) Int. Cl.
  *G06F 3/00*  (2006.01)
  *G06F 9/44*  (2006.01)
  *G06F 9/46*  (2006.01)
  *G06F 13/00*  (2006.01)
  *G06F 1/32*  (2006.01)
  *G06F 13/38*  (2006.01)
  *H04L 12/801*  (2013.01)

(52) U.S. Cl.
  CPC .............. *G06F 1/3253* (2013.01); *G06F 13/38* (2013.01); *H04L 47/10* (2013.01); *Y02B 60/1235* (2013.01); *Y02B 60/32* (2013.01)

(58) Field of Classification Search
  None
  See application file for complete search history.

(56) References Cited

U.S. PATENT DOCUMENTS

| 7,103,788 | B1 * | 9/2006 | Souza et al. ................... 713/323 |
| 7,793,279 | B1 * | 9/2010 | Le et al. ......................... 717/168 |
| 2007/0094378 | A1 * | 4/2007 | Baldwin et al. ................ 709/223 |
| 2007/0288623 | A1 * | 12/2007 | Kato et al. ...................... 709/223 |
| 2008/0098410 | A1 * | 4/2008 | Oshins et al. .................. 719/321 |
| 2008/0147928 | A1 * | 6/2008 | Nicolet et al. ................... 710/62 |
| 2008/0310391 | A1 * | 12/2008 | Schneidman et al. ......... 370/349 |

OTHER PUBLICATIONS

Notice of Preliminary Rejection dated Nov. 5, 2014 in connection with Chinese Patent Application No. 10-2009-0045748; 11 pages.

* cited by examiner

*Primary Examiner* — Craig Dorais

(57) ABSTRACT

An apparatus and a method support a selective suspend mode in a driver for any one of at least two devices constituting a composite network device. When a device of the driver requests suspend mode transition, a Physical Device Object (PDO) constituting a driver of the composite network device is identified by a PDO check part. A suspend mode transition request information of the device is sent to an operating system through the PDO. When the operating system allows the suspend mode transition, a control part sends suspend mode transition indication information to the device through the PDO.

22 Claims, 5 Drawing Sheets

APPARATUS AND METHOD FOR SUPPORTING SUSPEND OF COMPOSITE NETWORK DEVICE

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on May 26, 2009, and assigned Serial No. 10-2009-0045748, the entire disclosure of which is hereby incorporated by reference.

TECHNICAL FIELD OF THE INVENTION

The present invention relates generally to a composite network device. More particularly, the present invention relates to an apparatus and a method for supporting a selective suspend mode of a Universal Serial Bus (USB) composite network device.

BACKGROUND OF THE INVENTION

When a plurality of sub-devices is connected to ports linked to a host, the host uses a Universal Serial Bus (USB) selective suspend mode to reduce its power consumption. That is, when a USB device connected to the host stays in an idle mode for a certain time, the host suspends only the port connected to the USB device without affecting operations of the other ports connected to a USB root hub.

When a network device is connected to the host, the host needs to separately install programs such as driver and connection manager for the network device. For example, when a USB network device is connected, the host installs programs such as driver and connection driver, for the USB network device using a separate CD.

As discussed above, to get rid of the inconvenience in separately installing the programs relating to the network device when the network device is connected, a USB composite network device including a plurality of devices is adopted. For example, the USB composite network device includes a USB network device and a CD ROM for automatically installing a driver of the USB network device.

Since the USB composite network device also includes the plurality of the devices, the power consumption can be reduced by applying the USB selective suspend mode to the USB composite network device. However, the USB composite network device may not support the USB selective suspend mode according to its operating system, or it may take much time for the USB device to enter the suspend mode. For example, when the host runs Windows® XP® operating system, the driver of the USB composite network device sends suspend mode transition request information of the devices to the host only when receiving the suspend mode transition request from all of the devices of the USB composite network device. In other words, upon receiving the suspend mode transition request from any one of the devices of the USB composite network device, the driver may not send the suspend mode transition request information of the corresponding device to the host.

For example, when the host runs Windows Vista® operating system, the driver of the USB composite network device suffers from the considerable delay to send the suspend mode request information to the host with respect to a particular device, because of the internal logic for the selective suspend.

SUMMARY OF THE INVENTION

To address the above-discussed deficiencies of the prior art, it is a primary object of the present invention to provide an apparatus and a method for supporting a USB selective suspend function in a USB composite network device.

Another aspect of the present invention is to provide an apparatus and a method for reducing time delay when a USB composite network device enters a suspend mode.

Still another aspect of the present invention is to provide an apparatus and a method for a driver of a particular one of one or more devices of a USB composite network device to send suspend mode transition request information to a Physical Device Object (PDO) of a USB composite device driver.

Yet another aspect of the present invention is to provide an apparatus and a method for acquiring PDO information of a USB composite device driver at a driver of a particular one of one or more devices of a USB composite network device.

According to one aspect of the present invention, a method for supporting a selective suspend mode in a driver for any one of at least two devices constituting a composite network device includes identifying a PDO constituting a driver of the composite network device when a device of the driver requests suspend mode transition. Suspend mode transition request information of the device is sent to an operating system through the PDO. When the operating system allows the suspend mode transition, suspend mode transition indication information is sent to the device through the PDO.

According to another aspect of the present invention, an apparatus supports a selective suspend mode in a driver for any one of at least two devices constituting a composite network device. The apparatus includes a PDO check part for identifying a PDO constituting a driver of the composite network device. The apparatus also includes a control part for sending suspend mode transition request information of the device to an operating system through the PDO identified by the PDO check part when a device of the driver requests suspend mode transition and, when the operating system allows the suspend mode transition, controlling to send suspend mode transition indication information to the device through the PDO. An interface sends and receives messages to and from the composite device driver.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for supporting a selective suspend mode in a Universal Serial Bus (USB) composite network device. Herein, the selective suspend mode is supported only in some of one or more devices of the composite network device in an idle mode. That is, the selective suspend mode is supported only in some of the devices in the idle mode, compared to the idle mode in which the entire composite network device operates in the idle mode.

Figure 1:
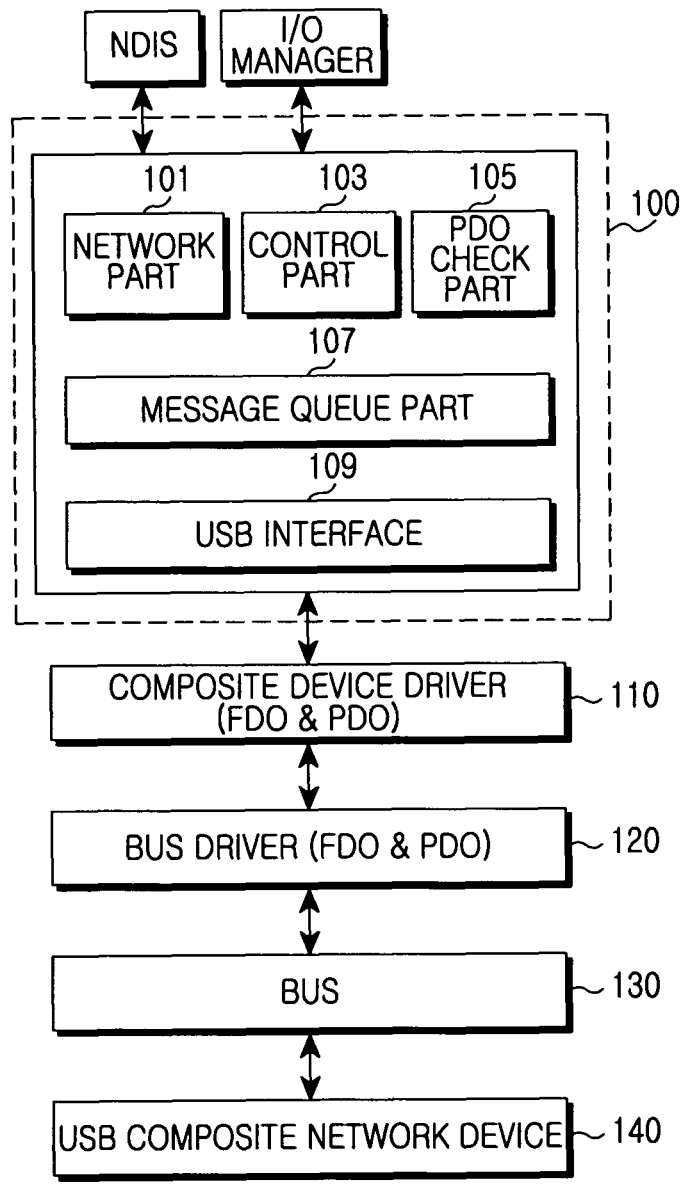
FIG. 1 illustrates a driver of a composite network device according to an embodiment of the present invention.

To support the selective suspend mode in the USB composite network device, a USB network device driver is constituted as shown in FIG. 1.

FIG. 1 illustrates a driver of the composite network device according to an embodiment of the present invention.

The USB composite network device of FIG. 1 includes a USB network device driver 100, a composite device driver 110, a bus driver 120, a bus 130, and a USB composite network device 140.

The USB network device driver 100 represents a program for controlling network devices of the USB composite network device 140. For example, the USB network device driver 100 includes a network part 101, a control part 103, a Physical Device Object (PDO) check part 105, a message queue part 107, and a USB interface 109.

The network part 101 processes a Network Driver Interface Specification (NDIS) message. Herein, the NDIS is a Local Area Network (LAN) card driver for a LAN manager that binds and enables the use of a multiprotocol stack within a single host by uniting environments of different operating systems or different network cards.

The control part 103 processes input/output (I/O) messages. For example, when receiving a selective suspend request message from the USB composite network device 140, the control part 103 controls to send an IDLE request I/O Request Packet (IRP) message to the host through the PDO according to PDO information of the composite device driver 110 received from the PDO check part 105. To process the active mode transition requested by the USB composite network device 140, the control part 103 controls to register an active mode transition wait wake callback to a Function Device Object (FDO) of the composite device driver 110. The control part 103 controls to send Setpower D2 information to the USB composite network device 140 through the PDO to change the network device to the suspend mode. For example, when the host requests to switch the network device of the suspend mode to the active mode, the control part 103 controls to send the Setpower D0 information to the USB composite network device 140 through the PDO. Additionally, when the USB composite network device 140 requests the active mode transition, the control part 103 controls to send the Setpower D0 information to the USB composite network device 140 through the PDO.

The PDO check part 105 acquires PDO information of the composite device driver 110. For example, the PDO check part 105 confirms a hub and a port number connected with the USB composite network device by requesting port connection information to hubs connected to the host. Next, the PDO check part 105 confirms the port number for each PDO of every port connected to the hub connected with the USB composite network device. The PDO check part 105 acquires the PDO information of the composite device driver 110 by comparing the port number of each PDO with the port number connected to the USB composite network device.

The message queue part 107 queues messages transmitted and received by the USB network device driver 100.

The USB interface 109 transmits and receives messages to and from the composite device driver 110. For example, the USB interface 109 sends the IDLE request IRP message to the PDO of the composite device driver 110 under the control of the control part 103.

The composite device driver 110, which is the program for controlling the USB composite network device 140, includes a Function Device Object (FDO) and the PDO.

The bus driver 120 controls the devices connected to the host to send and receive messages via the bus 130.

The USB composite network device 140 includes a plurality of devices including the USB network device. For example, the USB composite network device 140 includes the USB network device and a CD ROM for automatically installing the driver for the USB network device. Alternatively, the USB composite network device 140 can include two or more network devices.

Figure 2:
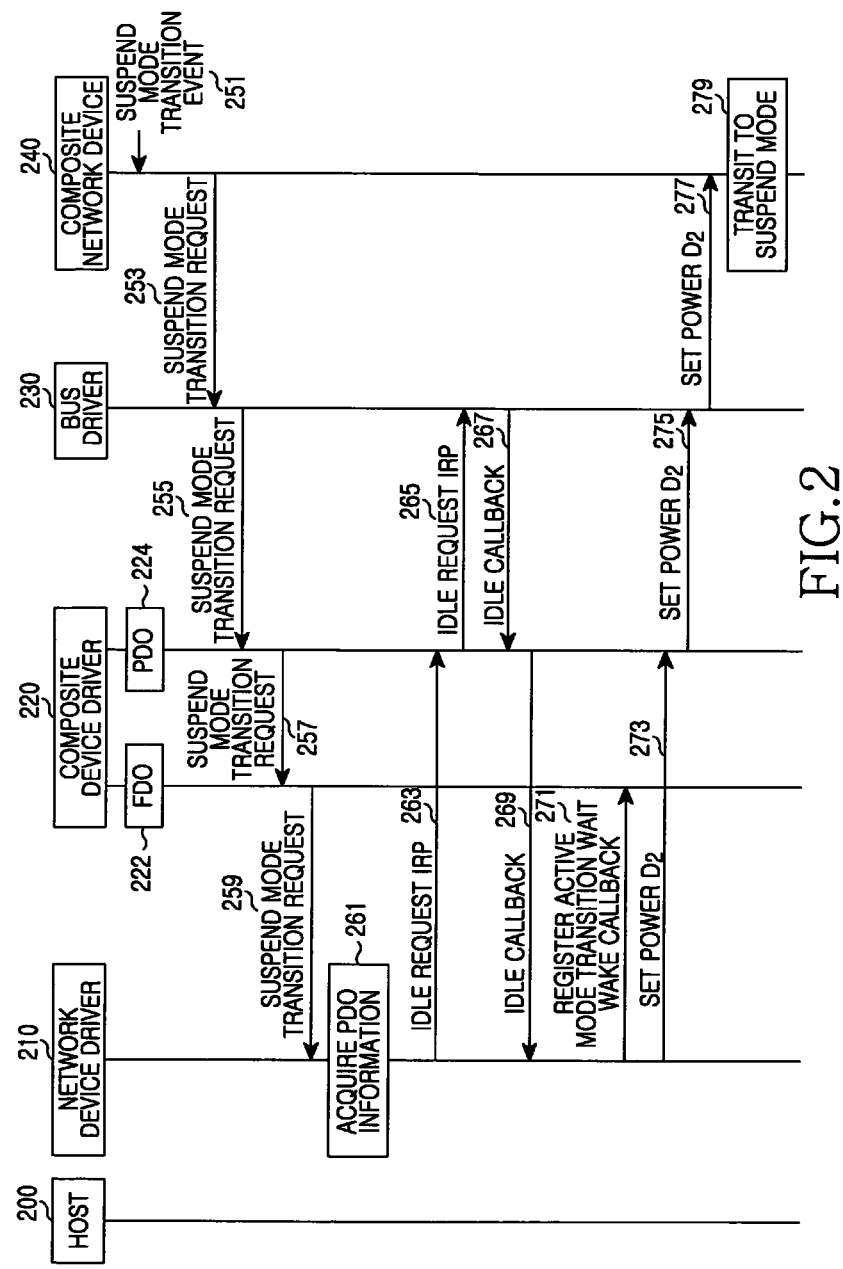
FIG. 2 illustrates a process for changing the composite network device to a suspend mode according to an embodiment of the present invention.

To support the selective suspend mode in the USB composite network device, the USB network device driver operates as shown in FIG. 2.

FIG. 2 illustrates a process for changing the composite network device to the suspend mode according to an embodiment of the present invention.

As shown in FIG. 2, when a suspend mode transition event occurs in the composite network device 240 in step 251, the composite network device 240 requests the suspend mode transition to the network device driver 210 via the bus driver 230, the PDO 224, and the FDO 222 in steps 253 through 259. For example, when there is no traffic in the network and the network device of the composite network device 240 enters the idle mode, the composite network device 240 requests the suspend mode transition to the bus driver 230 to suspend the network device.

Upon receiving the suspend mode transition request from the FDO 222, the network device driver 210 confirms the PDO 224 information of the composite device driver 220 in step 261. For example, the network device driver 210 acquires the hub and the port number connected with the USB composite network device by requesting the port connection information to the hubs connected to the host. Next, the network device driver 210 confirms the port number of each PDO of every port connected to the hub connected with the USB composite network device. The network device driver 210 identifies the PDO 224 of the composite device driver 220 by comparing the port number of each PDO with the port number connected with the USB composite network device.

Next, the network device driver 210 sends the IDLE request IRP message to the PDO 224 in step 263. By doing so, the network device driver 210 waits for a response for the IDLE request IRP message.

Upon receiving the IDLE request IRP message from the network device driver 210, the PDO 224 sends the IDLE request IRP message to the bus driver 230 in step 265.

In response to the IDLE request IRP message, the bus driver 230 sends an IDLE callback message to the network device driver 210 through the PDO 224 in steps 267 and 269. For example, upon receiving the IDLE request IRP message from the PDO 224, the bus driver 230 checks whether it enters the idle mode by sending the IDLE request IRP message to the Operating System (OS) through the bus. When the OS allows the idle mode entrance, the bus driver 230 sends the IDLE callback message to the network device driver 210 via the PDO 224.

When receiving the IDLE callback message, the network device driver 210 registers the active mode transition wait wake callback to the FDO 222 of the composite device driver 220 in step 271. That is, to process the active mode transition requested by the composite network device 240, the network device driver 210 registers the active mode transition wait wake callback to the FDO 222 of the composite device driver 220.

To suspend the network device of the composite network device 240, the network device driver 210 sends Setpower D2 information to the composite network device 240 via the PDO 224 and the bus driver 230 in steps 273 through 277.

The composite network device 240 suspends the network device according to the Setpower D2 information in step 279.

When the USB composite network device enters the selective suspend mode as stated above, the power of the PDO 224 of the composite device driver 220, the bus driver 230, and the composite network device 240 is set to D2. However, the power of the host 200, the network device driver 210, and the FDO of the composite device driver 220 is set to D0. Herein, the D0 indicates the normal operation mode and the D2 indicates the idle operation mode.

In this embodiment, when the composite network device 240 requests the suspend mode transition, the network device driver 210 checks the PDO 224 of the composite device driver 220.

Alternatively, regardless of the suspend mode transition request of the composite network device 240, the network device driver 210 may confirm the PDO 224 of the composite device driver 220 in advance.

The network device driver 210 of FIG. 2 identifies the PDO 224 of the composite device driver 220 and thus sends the IDLE request IRP message directly to the PDO 224 without passing through the FDO 222. The network device driver 210 checks the PDO 224 of the composite device driver 220 as shown in FIG. 3.

Figure 3:
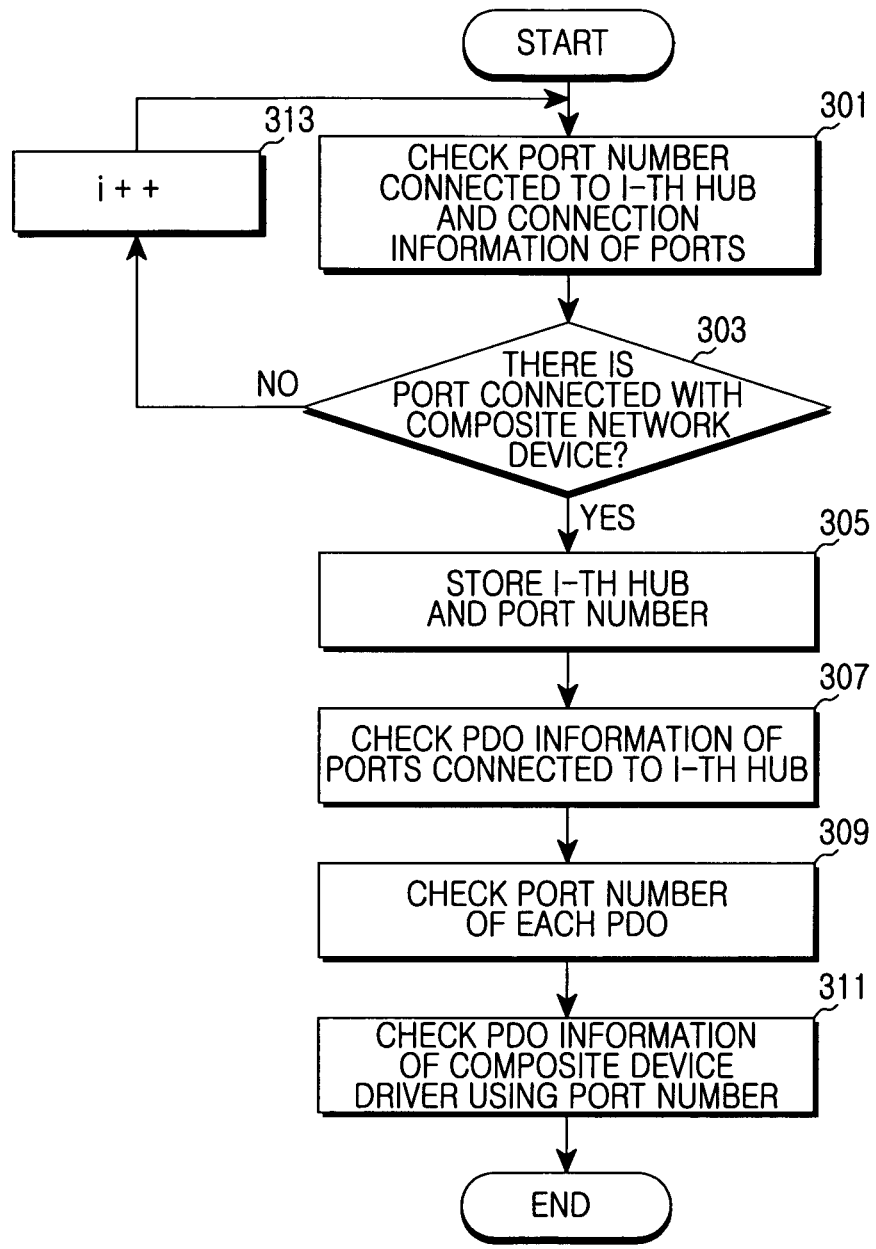
FIG. 3 illustrates a process for acquiring PDO information of a composite driver in the driver of the composite network device according to an embodiment of the present invention.

FIG. 3 illustrates a process for acquiring the PDO information of the composite driver in the driver of the composite network device according to an embodiment of the present invention.

In step 301, the network device driver confirms the port number connected to the i-th hub of one or more hubs linked to the host and the connection information of the device connected to each port. For example, the network device driver requests the port number connected to the hub and the connection information of the devices connected to the ports to the i-th hub and thus acquires the port number connected to the i-th hub and the connection information of the devices connected to the ports. Herein, the connection information includes a vendor ID and a product ID. The i, which is an index of the hub, is set to 1 as its initial value.

In step 303, the network device driver checks whether there is a port connected with the composite network device using the connection information of the devices linked to the ports. For example, the network device driver checks for the port connected to the composite network device in the i-th hub by comparing the connection information of the composite network device with the connection information of the devices connected to the ports.

When there is no port connected to the composite network device in the i-th hub, the network device driver increments the hub index i in step 313.

When the port is connected to the composite network device in the i-th hub, the network device driver stores the hub index and the port number connected with the composite network device in step 305.

In step 307, the network device driver checks the PDO of the ports connected to the hub connected with the composite network device. For example, the network device driver identifies the PDO for every port by requesting the PDO to the ports.

After checking the PDO of the ports connected to the hub, the network device driver identifies the port number for each PDO in step 309. For example, the network device driver acquires the port number of each PDO by requesting the port number to the PDOs.

In step 311, the network device driver identifies the PDO of the same port number as the port number stored in step 305, as the PDO of the composite device driver.

Next, the network device driver finishes this process.

Figure 4:
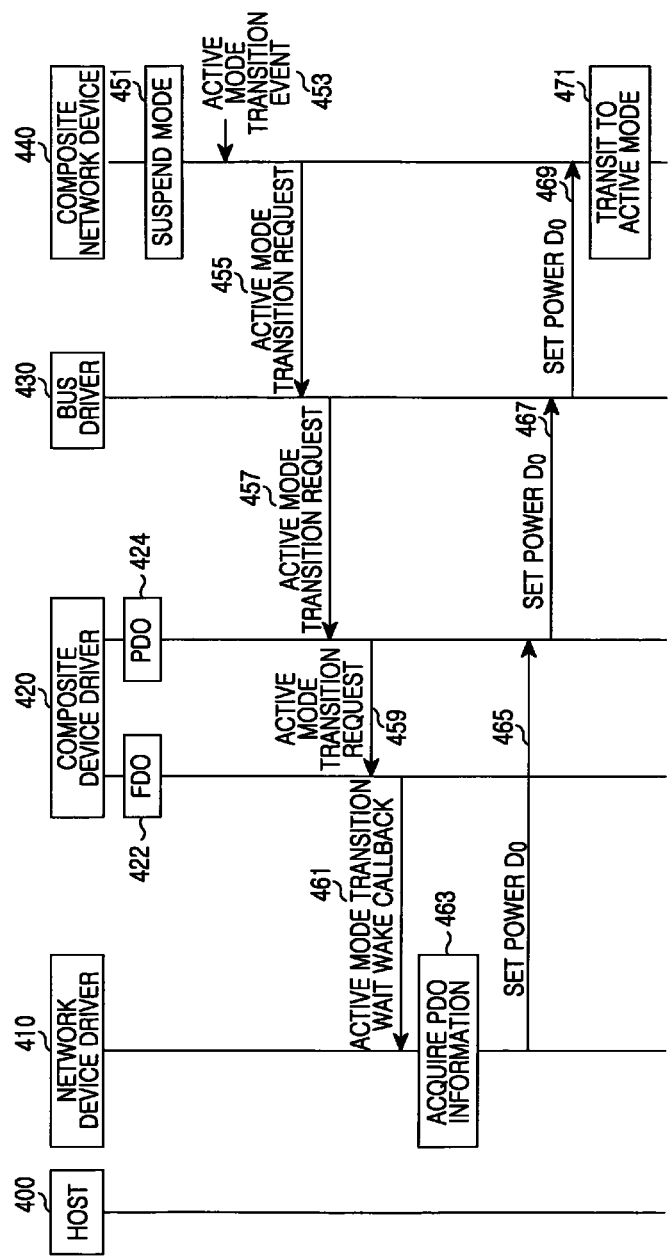
FIG. 4 illustrates a process for changing the composite network device to an active mode according to an embodiment of the present invention.

In the following, a method for activating the suspended network device is described. In FIG. 4, it is assumed that the network device itself requests to transition to the active mode.

FIG. 4 illustrates a process for changing the composite network device to the active mode according to an embodiment of the present invention.

When the network device belonging to the composite network device operates in the selective suspend mode in step 451, the power of the PDO 424 of the composite device driver 420, the bus driver 430, and the composite network device 440 is set to D2. By contrast, the power of the host 400, the network device driver 410, and the FDO 422 of the composite device driver 420 is set to D0. Herein, the D0 power level indicates the normal operation mode and the D2 power level indicates the idle operation mode.

When the active mode transition event occurs in the composite network device 440 in step 453, the composite network device 440 requests the active mode transition to the FDO 422 via the bus driver 430 and the PDO 424 in steps 455 through 459.

When the composite network device 440 requests the active mode transition, the FDO 422 sends an active mode transition wait wake callback signal to the network device driver 410 in step 461 according to the active mode transition wait wake callback registered by the network device driver 410 when the network device was suspended.

Upon receiving the active mode transition wait wake callback signal from the FDO 422, the network device driver 410 acquires the PDO 424 information of the composite device driver 420 in step 463. For example, the network device driver 410 requests the port connection information to the hubs connected to the host and thus acquires the hub and the port number connected with the USB composite network device. Next, the network device driver 410 identifies the port number of each PDO of every port connected to the hub connected with the USB composite network device. The network device driver 410 confirms the PDO 424 of the composite device driver 420 by comparing the port number for each PDO with the port number connected with the USB composite network device.

Next, to change the network device of the composite network device 440 to the active mode, the network device driver 410 sends the Setpower D0 information to the composite network device 440 via the PDO 424 and the bus driver 430 in steps 465 through 469.

In step 471, the composite network device 440 changes the network device to the active mode according to the Setpower D0 information.

Now, a method for changing the suspended network device to the active mode according to the request of the host is explained.

Figure 5:
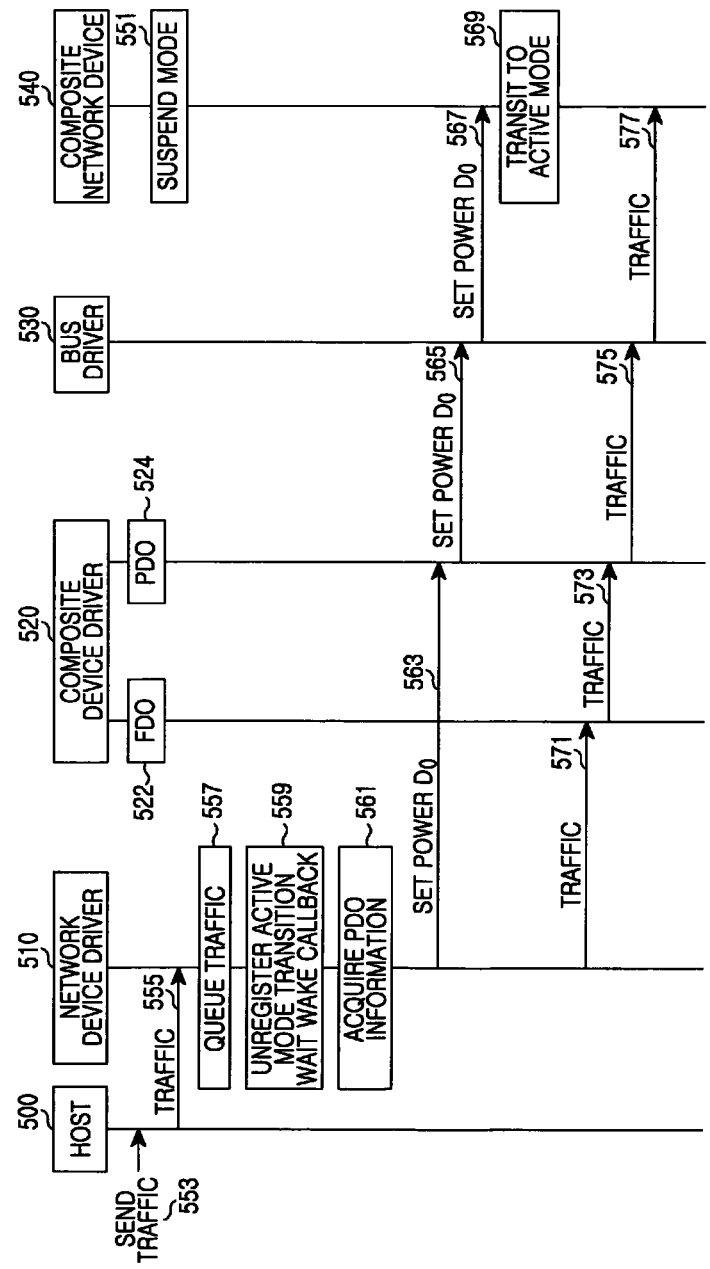
FIG. 5 illustrates a process for changing the composite network device to the active mode according to another embodiment of the present invention.

FIG. 5 illustrates a process for changing the composite network device to the active mode according to another embodiment of the present invention.

When the network device belonging to the composite network device operates in the selective suspend mode in step 551, the power of the PDO 524 of the composite device driver 520, the bus driver 530, and the composite network device is set to D2. Yet, the power of the host 500, the network device driver 510, and the FDO 522 of the composite device driver 520 is set to D0. Herein, the D0 power level indicates the normal operation mode and the D2 power level indicates the idle operation mode.

When the host 500 has traffic to send to the network device of the composite network device 540 in step 553, the host 500 sends the traffic to the network device driver 510 in step 555.

Since the network device that receives the traffic from the host 500 is in the selective suspend mode, the network device driver 510 queues the traffic received from the host 500 in step 557.

In step 559, the network device driver 510 unregisters the active mode transition wait wake callback that was registered to the FDO 522 of the composite device driver 520 when the network device was suspended. The active mode transition wait wake callback registered to the FDO 522 is to allow the network device operating in the suspend mode to request the active mode transition. Hence, when the host 500 requests the active mode of the network device, the network device driver 510 unregisters the active mode transition wait wake callback because there is no need to use the active mode transition wait wake callback registered to the FDO 522.

In step 561, the network device driver 510 acquires the PDO 524 information of the composite device driver 520. For example, the network device driver 510 requests the port connection information to the hubs connected to the host and thus acquires the hub and the port number connected with the USB composite network device. Next, the network device driver 510 identifies the port number for each PDO of every port connected to the hub connected with the USB composite network device. By comparing the port number of each PDO with the port number connected with the USB composite network device, the network device driver 510 identifies the PDO 524 of the composite device driver 520.

To change the network device of the composite network device 540 to the active mode, the network device driver 510 sends the Setpower D0 information to the composite network device 540 via the PDO 524 and the bus driver 530 in steps 563 through 567.

The composite network device 540 changes the network device to the active mode according to the Setpower D0 information in step 569.

After sending the Setpower D0 information, upon recognizing or confirming that the network device of the composite network device 540 enters the active mode, the network device driver 510 sends the queued traffic to the composite network device 540 via the FDO 522, the PDO 524, and the bus driver 530 in steps 571 through 577.

In this embodiment, the network device driver 510 queues the traffic and then unregisters the active mode transition wait wake callback. Yet, the network device driver 510 can unregister the active mode transition wait wake callback any time after it recognizes that the suspended network device is switched to the active mode according to the request of the host.

As above, when the network device driver 210 directly sends the IDLE request IRP message to the PDO 224, the power consumption and the suspend mode entry delay can be reduced as shown in Table 1.

TABLE 1

| | Window XP | | Window Vista | |
| --- | --- | --- | --- | --- |
| | present invention is not applied | present invention is applied | present invention is not applied | present invention is applied |
| power consumption | 40 mA | 0.8 mA | 0.8 mA | 0.8 mA |
| suspend mode entry delay | it cannot enter the suspend mode | 300 ms | 4000 ms | <1 ms |

When the host runs Windows® XP® operating system, the present invention is not applied, and at least one of the devices of the composite network device does not send the IDLE request IRP message, it cannot enter the suspend mode. By contrast, when the present invention is applied and at least one of the devices of the composite network device sends the IDLE request IRP message, it can enter the suspend mode. Thus, the power consumption and the suspend mode entry delay can be reduced.

When the host runs Windows® Vista® operation system, the present invention is not applied, and the device of the composite network device is suspended, the internal logic for the selective suspend results in the suspend mode entry delay. By contrast, when the present invention is applied and the composite network device is suspended, the suspend mode entry delay caused by the internal logic can be reduced below 1 ms.

As set forth above, the driver of a particular one of one or more devices constituting the USB composite network device itself requests the suspend mode transition to the PDO of the USB composite device driver. Therefore, it is possible to use the USB selective suspend function for the USB composite network device in Windows® XP® and to reduce the time delay taken to suspend the USB composite network device in Windows® Vista®.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting a selective suspend mode in a driver of a composite network device, the method comprising:
   identifying a Physical Device Object (PDO) for a first device among a plurality of PDOs constituting the driver if the first device among a plurality of devices constituting the composite network device requests a suspend mode transition, the network device comprising the plurality of PDOs and a Function Device Object (FDO);
   sending an idle request for the first device to an operating system through the identified PDO without passing through the FDO; and
   sending a suspend mode transition indication information to the first device through the identified PDO if the operating system allows the suspend mode transition.

2. The method of claim 1, wherein identifying the PDO further comprises:
   checking connection information of devices connected to ports of the at least one hub connected to a host;
   determining whether the composite network device is connected to one of the ports of the at least one hub by comparing the connection information of the plurality of devices connected to the ports with connection information of the composite network device;
   identifying the PDO for each port of the hub connected to the composite network device;
   checking the port number of each PDO; and
   confirming the plurality of PDOs of the composite network device by comparing the port number connected to the composite network device with the port number for the PDO.

3. The method of claim 2, wherein the connection information comprises at least one of a vendor ID and a product ID.

4. The method of claim 1, wherein sending the suspend mode transition indication information comprises:
   receiving a response signal from the identified PDO according to the idle request if the operating system allows the suspend mode transition; and
   sending the suspend mode transition indication information to the first device through the identified PDO.

5. The method of claim 4, further comprising:
   after receiving the response signal, registering an active mode transition callback to the FDO constituting the driver of the composite network device.

6. The method of claim 1, further comprising:
   while the first device is in the selective suspend mode, sending an active mode transition indication information to the first device through the identified PDO if an active mode transition callback signal is received from the FDO constituting the driver of the composite network device.

7. The method of claim 6, wherein sending the active mode transition indication information comprises:
   if receiving the active mode transition callback signal, identifying the PDO for the first device among the plurality of PDOs constituting the driver of the composite network device; and
   sending the active mode transition indication information to the first device through the identified PDO.

8. The method of claim 7, wherein the identifying the PDO comprises:
   checking connection information of devices connected to ports of the at least one hub connected to a host;
   determining whether the composite network device is connected to one of the ports of the at least one hub comparing the connection information of the plurality of devices connected to the ports with connection information of the composite network device;
   identifying the PDO for each port of the hub connected to the composite network device; and
   checking the port number of each PDO; and
   confirming the PDOs of the composite network device by comparing the port number connected to the composite network device with the port number of the PDO.

9. The method of claim 1, further comprising:
   after sending the suspend mode transition indication information to the first device, storing traffic if the traffic to send to the first device is received from a host;
   sending the active mode transition indication information to the first device through the identified PDO; and
   sending the stored traffic to the first device through the FDO.

10. The method of claim 9, further comprising:
    when receiving traffic to send to the first device from the host, releasing the active mode transition callback registered to the FDO.

11. The method of claim 9, wherein sending the active mode transition indication information comprises:
    identifying the PDO for the first device among the plurality of PDOs constituting the driver of the composite network device; and
    sending the active mode transition indication information to the device through the identified PDO.

12. An apparatus for supporting a selective suspend mode in a driver of a composite network device, the apparatus comprising:
    a Physical Device Object (PDO) check part configured to identify a PDO for a first device among a plurality of PDOs constituting the driver if the first device among a plurality of devices constituting the composite network device requests a suspend mode transition, the network device comprising the plurality of PDOs and a Function Device Object (FDO);
    a control part configured to:
       send an idle request for the first device to an operating system through the PDO identified by the PDO check part without passing through the FDO when a device of the driver requests suspend mode transition, and send a suspend mode transition indication information to the first device through the identified PDO if the operating system allows the suspend mode transition; and
    an interface configured to send and receive messages to and from the composite device driver.

13. The apparatus of claim 12, wherein, when the first device of the driver requests to enter the suspend mode, the PDO check part is further configured to:
    check connection information of the plurality of devices connected to ports of the at least one hub connected to a host,
    determine whether the composite network device is connected to one of the ports of the at least one hub by comparing the connection information of the plurality of devices connected to the ports with connection information of the composite network device,
    identify the PDO for each port of the hub connected to the composite network device,
    check the port number of each PDO, and confirm the PDOs of the composite network device by comparing the port number connected to the composite network device with the port number for the PDO.

14. The apparatus of claim 13, wherein the connection information comprises at least one of a vendor ID and a product ID.

15. The apparatus of claim 12, wherein, if the operating system allows the suspend mode transition and a response signal is received from the identified PDO according to the idle request, the control part is further configured to register an active mode transition callback to the FDO constituting the driver of the composite network device.

16. The apparatus of claim 12, wherein, if receiving an active mode transition callback signal from the FDO, the control part is further configured to send an active mode transition indication information to the first device of the driver through the identified PDO.

17. The apparatus of claim 16, wherein, when receiving the active mode transition callback signal from the FDO, the PDO check part is further configured to confirm the PDO.

18. The apparatus of claim 12, wherein, if receiving traffic to send to the device operating in the suspend mode from the host, the control part is further configured to send the active mode transition indication information to the first device through the identified PDO.

19. The apparatus of claim 18, further comprising:
a storage part configured to store data,
wherein, if receiving traffic to send to the first device operating in the suspend mode from the host, the control part is further configured to control the storage part to store the traffic.

20. The apparatus of claim 18, wherein, when receiving traffic to send to the first device from the host, the control part is further configured to release the active mode transition callback registered to the FDO.

21. The apparatus of claim 18, wherein, when receiving traffic to send to the first device from the host, the PDO check part is further configured to identify the PDO.

22. The apparatus of claim 12, further comprising:
a network manager configured to process a Network Driver Interface Specification (NDIS) message.

* * * * *